WILLIAM DOYLE.

Improvement in Combined Stove-Lids and Dampers.

No. 4,359. Reissued May 2, 1871.

Witnesses

E. H. Doyle

James Speight

Inventor.

Wm Doyle

A.N. PHOTO-LITHOGRAPHIC CO. N.Y. (OSBORNE'S PROCESS.)

United States Patent Office.

WILLIAM DOYLE, OF ALBANY, NEW YORK.

Letters Patent No. 89,861, dated May 11, 1869; reissue No. 4,359, dated May 2, 1871.

IMPROVEMENT IN COMBINED STOVE-LIDS AND DAMPERS.

The Schedule referred to in these Letters Patent and making part of the same.

*To all whom it may concern:*

Be it known that I, WILLIAM DOYLE, of Albany, in the county of Albany and State of New York, have invented a new and improved Stove-Cover or Ring-Damper; and I do hereby declare that the following is a full, clear, and exact description thereof, reference being had to the accompanying drawing forming a part of this specification and to the letters of reference marked thereon, in which—

Similar letters of reference indicate like parts in all the figures.

The principal feature of my invention consists in dampers or valve-flanges attached to the under side of a stove-cover or lid, or to an enlargement or a reducing-ring of a stove, the said valves or dampers thereof being formed by concentric flanges which project from their lower surfaces downward across the flue-space, under the top plate of the stove, over the oven, and being arranged respectively in connection with division-plates and valve apertures, so that by simply turning the cover or ring-damper the passage of the draught may be closed, or partially closed, as directed, in any manner desired, through the stove.

Another feature of my invention consists in the combination of stove-cover or damper-rings with front descending-flues, as will be hereinafter described.

Figure 1:
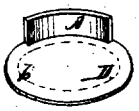
Figure 1 is a perspective view of a stove-cover with my invention attached thereto.
Figure 2:
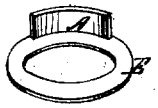
Figure 2 is a perspective view of a stove-ring having my invention attached to it.
Figure 4:
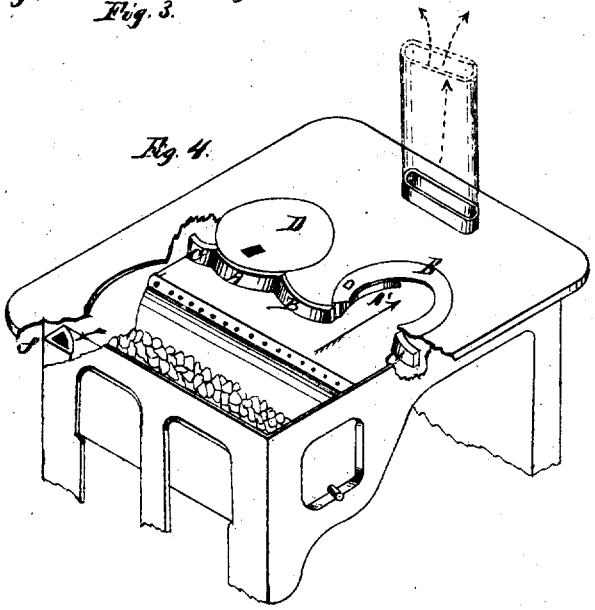
Figure 4 is a perspective view of the upper portion of a stove embodying my invention.

A is a segment of a concentric circular flange or rim which is attached to the under side of a stove-cover or a ring, as shown in figs. 1 and 2. Said circular flange or rim A is made of a portion of a circle whose diameter is nearly equal to that of the hole in the top of the stove in which it is to be used.

The reason of this will be seen when we consider that the rim A on the under side of cover D or ring E must set as close to the edges of the side flue-strips C C and center flue or partition-plate B as is possible, in order to shut off all or a portion of the direct back-draught of the fire whenever required.

The cover D and ring E with their concentric flanges A may be used in any stove, or the cover D may be used in some cases and the ring E in others, both operating precisely in the same manner and producing the same changes in the draught of the stove.

Figure 3:
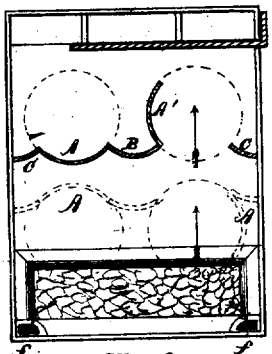
Figure 3 is a plan of the top of a stove having my invention applied to it.

B is a central flue-strip, usually made to support the top of the stove, and should be extended to the edges of the holes, as shown in fig. 3.

C designates flue-strips, set against the sides of the stove, and extending to the edges of the stove-holes respectively to which they belong, as shown in figs. 2 and 3.

Flue-strips C C and B may be curved, as shown in the accompanying drawing, or they may be made straight and set at such an angle as to conduct easily the products of combustion from the fire-pot of the stove to the exit-flue of the same.

D is a stove-cover, and

E a reducing or an enlargement-ring, having my invention, the circular concentric flange or damper A, attached to them.

Suitable marks may be made on said cover D or ring E, and on the adjacent stove-plates, to indicate their proper position, or there may be stops or any other suitable device by which said cover and ring D and E may be kept in place.

It will be seen from the above description that whenever the damper-flanges A are turned so as to be directly across the flue-openings between flue-strips C and B, as shown on the left side of figs. 2 and 3, all communication with the direct draught of the stove will be cut off, and if the stove is provided with front descending-flues, as shown in figs. 2 and 3, then all the products of combustion will be forced to pass down said flues, as shown at *f*, in figs. 2 and 3.

When it is desired to have all the fire pass toward one of the boiler-holes, then the covers D or flanges A are turned, as shown in figs. 2 and 3, in which A′ designates one concentric damper, as turned to one side, leaving the flue-space between B and C on the right side of the stove wide open, the opposite flange or concentric damper being turned, so as to shut off or close all communication on that side of the stove with the direct draught. Thus it will be seen that nearly all the heat from the fire will be concentrated on the right side of the stove, as shown in figs. 2 and 3.

I do not confine myself in the use of said ring or cover, (concentric damper-flanges A,) to the back holes of a cooking-stove, for they may be used in the front holes if desired.

The dotted line *b*, in fig. 1, indicates the inner diameter of an enlargement-ring, such as is used in some stoves. Thus in this figure are shown two modes of constructing my invention, the one a ring-damper, the other a cover damper.

In fig. 2 a ring-damper is shown, which is the same device that is indicated by dotted line *b*, in fig. 1.

It will also be seen that by means of the two dampers A A, as above described, I can regulate to any degree required the intensity of the direct draught of the stove in which my invention is used, thus enabling me to restrain the too rapid combustion of fuel, and thus to retain the fire for a longer period of time without the necessity of frequent additions of fuel thereto.

What I claim as new, and desire to secure by Letters Patent, is—

1. The concentric damper-flange A and ring E, combined and arranged substantially as and for the purpose herein shown.

2. The concentric damper-flange A and cover D, combined and arranged substantially as herein shown and set forth.

3. The combination of ring E or cover D, constructed as described, with flue-strips C C and B, or their equivalents, as herein shown and described.

4. The combination of ring E or cover D with front descending-flues *f f*, in the manner and for the purpose herein shown and set forth.

WM. DOYLE.

Witnesses:
E. H. DOYLE,
JAMES WRIGHT.